No. 754,535. PATENTED MAR. 15, 1904.
H. H. BELL.
GATE.
APPLICATION FILED OCT. 26, 1903.
NO MODEL.
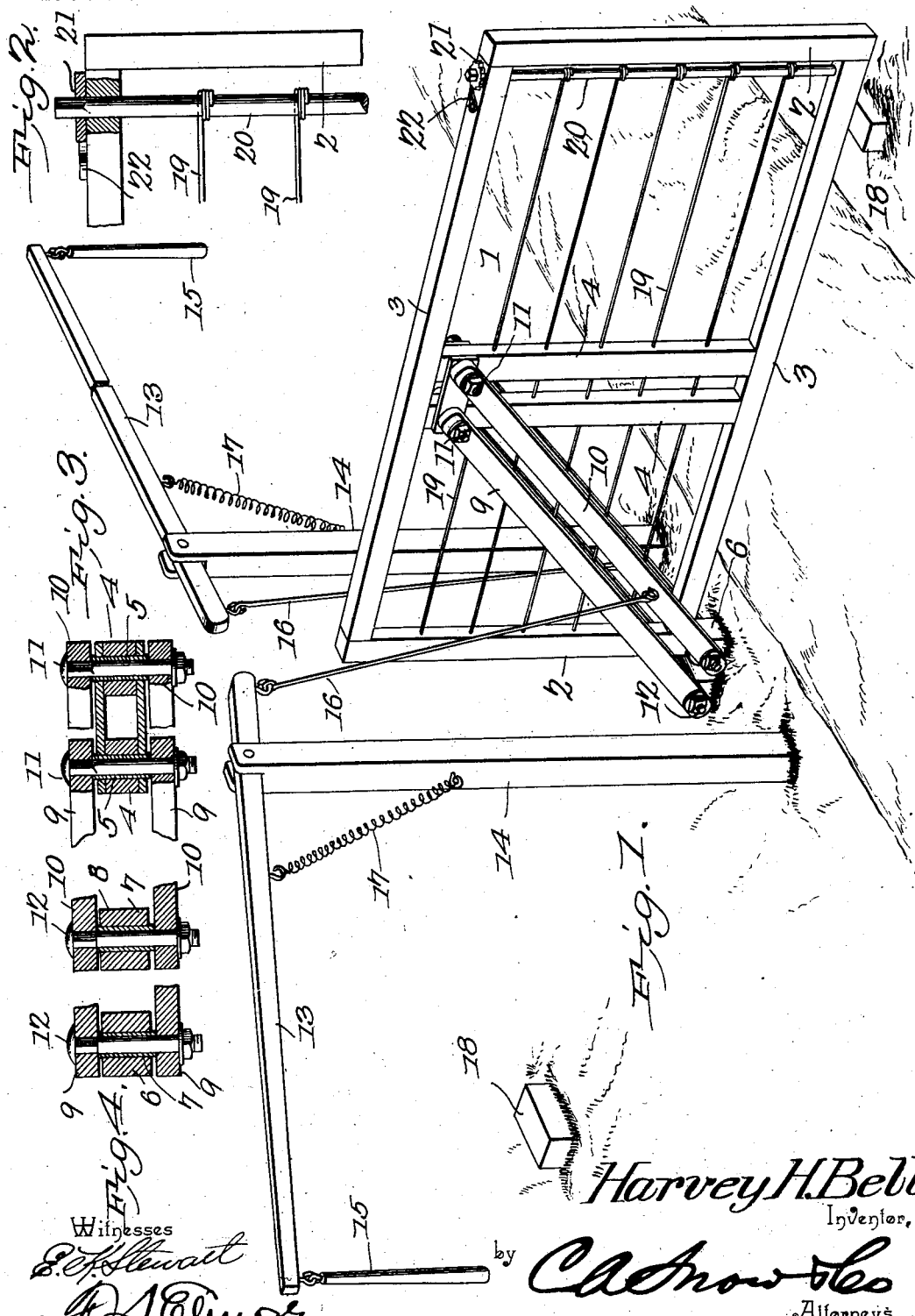
Harvey H. Bell,
Inventor,
by C. A. Snow & Co
Attorneys
Witnesses No. 754,535. Patented March 15, 1904.

UNITED STATES PATENT OFFICE.

HARVEY H. BELL, OF NEVADA, IOWA.

GATE.

SPECIFICATION forming part of Letters Patent No. 754,535, dated March 15, 1904.

Application filed October 26, 1903. Serial No. 178,633. (No model.)

*To all whom it may concern:*

Be it known that I, HARVEY H. BELL, a citizen of the United States, residing at Nevada, in the county of Story and State of Iowa, have invented a new and useful Gate, of which the following is a specification.

My invention relates to gates, and has for its objects to produce a comparatively simple and inexpensive device of this character which may be readily operated at a point distant therefrom and one in which springs connected with the operating-levers serve to assist the opening movement and yieldably sustain the weight of the gate toward the completion of the closing movement, thus relieving the gate of injury during the latter movement.

To these ends the invention comprises the novel features of construction and combination of parts more fully hereinafter described.

In the accompanying drawings, Figure 1 is a perspective view of a gate embodying my invention. Fig. 2 is a front end elevation of the same. Figs. 3 and 4 are detail horizontal sectional views through the bearings at the upper and lower ends, respectively, of the operating members.

Referring to the drawings, 1 designates the gate, comprising front and rear end bars 2 and top and bottom rails 3, connected just in rear of the longitudinal center of the gate by vertical transverse brace-bars 4, through which latter there extend, adjacent to the top of the gate, transverse journal-boxes or sleeves 5, composed of metal, the remaining parts of the gate being composed of wood or other suitable material.

6 6 indicate a pair of bearing members preferably in the form of short vertical posts rising from the ground just in rear of the rear end of the gate when closed and disposed in spaced alinement with the longitudinal axis of the gate, these posts being provided with transverse metal sleeves or bearing-boxes 7 for the purpose which will presently appear.

9 and 10 represent two pairs of gate supporting and operating members preferably in the form of metal links arranged in parallel relation, with their upper ends pivoted to the gate by horizontal transverse bolts 11, extending through the bearing-boxes 5, and their lower ends pivoted to the bearing members 6 by similar bolts 12, extending through the bearing-boxes 7. The links of each pair are oppositely disposed, one on either side of the gate, while the links 10 are situated in advance of and slightly spaced from the links 9. It may here be said that the links in operation are adapted to describe an arc of a circle upon their lower pivotal axes or bolts 12, and thus in moving from their normally forwardly inclined position carry the gate by a longitudinal movement of the latter from a closed to an open position. For operating the links to open and close the gate I preferably employ traction-levers 13, pivoted adjacent to their forward ends at the upper ends of vertical posts or standards 14, situated upon the opposite sides of the gate adjacent thereto, said levers having their outer ends terminated at points suitably remote from the gate and provided with depending handpieces 15. Pivoted to the forward end of each lever is the upper end of a connecting rod or element 16, pivoted in turn at its lower end adjacent to the lower end of one of the forward links 10. From this arrangement it is apparent that downward stress upon the outer end of either of the actuating-levers will serve to swing the operating links or members on their pivots from their initial inclined position to a position with their upper ends past center, whereby the weight of the gate, which is carried by the links, will continue the movement of the latter and complete the opening or closing movement of the gate, as the case may be.

In order to assist the traction-levers in lifting the gate, and thus relieve the operator of the bulk of the strain incident thereto, I provide actuating-springs 17, one for each of the levers. Each spring is attached at its upper end to the lever at a suitable point outward from its pivot and at its lower end to the standard 14. These springs are when the gate is either fully opened or closed in an expanded condition and in tending to contract exert a power nearly sufficient to overcome the weight of the gate, upon which latter both springs at all times exert their influence, whereby a comparatively moderate pull upon the traction-levers will initiate the movement of the gate, as above described. When the gate has completed half of its movement, the springs will of course have partially contracted, so that during the latter half of said movement under the influence of the weight of the gate the springs must be again expanded, and thus serve to yieldingly sustain the weight of the gate and lower it gently to the ground, whereby injurious shocks to the gate are wholly obviated. When in either its open or closed position, one end of the gate will rest upon and be supported by the bearing members 6, the other end being sustained by a suitable supporting-block 18.

In practice the gate may be provided with suitable horizontal filling-wires 19, engaged at their forward ends with a vertical rotary tension-bar 20, provided at its upper end with a toothed ratchet-wheel 21, engaged by a pawl 22, pivoted to the upper rail 3, whereby the wires may be placed and maintained under suitable tension.

From the foregoing it will be seen that I produce a device of simple construction which is admirably adapted for the attainment of the ends in view; but it is to be understood that I do not limit myself to the precise details herein set forth, inasmuch as minor changes may be made therein without departing from the spirit of the invention.

Having thus described my invention, what I claim is—

The combination with a gate, of bearing members, operating-links pivotally connected with the latter and the gate, said links being adapted to swing in a vertical plane for opening and closing the gate, standards disposed adjacent to the gate, traction-levers pivotally connected with the standards, operative connections between the levers and links, and springs connected at their lower ends with the standards and at their upper ends with the levers outside of the fulcra of the latter, said springs being adapted to act directly upon the levers to assist the opening, and support the gate during the closing, movement.

In testimony that I claim the foregoing as my own I have hereto affixed my signature in the presence of two witnesses.

HARVEY H. BELL.

Witnesses:
  B. F. BELL,
  J. G. RICHMOND.